United States Patent [19]

Graupe et al.

[11] 4,086,435

[45] Apr. 25, 1978

[54] METHOD OF AND MEANS FOR SCRAMBLING AND DESCRAMBLING SPEECH AT AUDIO FREQUENCIES

[75] Inventors: Daniel Graupe, Fort Collins, Colo.; G. Donald Causey, Chevy Chase, Md.

[73] Assignee: Biosystems Research Group II, Chevy Chase, Md.

[21] Appl. No.: 724,170

[22] Filed: Sep. 17, 1976

[51] Int. Cl.[2] .......... H04L 9/02

[52] U.S. Cl. .......... 179/1.5 R; 179/1.5 E

[58] Field of Search .......... 179/1.5 R, 1.5 E; 340/347 AD

[56] References Cited

U.S. PATENT DOCUMENTS

| | | | |
|---|---|---|---|
| 2,777,897 | 1/1957 | Gretener et al. | 179/1.5 R |
| 3,427,399 | 2/1969 | Ehrat | 179/1.5 R |
| 3,497,623 | 2/1970 | Todd | 179/1.5 R |
| 3,504,286 | 3/1970 | Jacobaeus | 179/1.5 R |
| 3,746,799 | 7/1973 | Gentges | 179/1.5 R |
| 3,813,493 | 5/1974 | Hughes et al. | 179/1.5 R |
| 3,983,327 | 9/1976 | Gannett et al. | 179/1.5 R |

*Primary Examiner*—Howard A. Birmiel
*Attorney, Agent, or Firm*—Donald M. Sandler

[57] ABSTRACT

Processing an input audio-frequency analog signal, for example, speech, which is to be passed through a communication channel, includes performing an n-level digitizing of the input signal, transforming the levels of the digitized signal to other levels using a pre-selected n-bit transformation code, and converting the transformed digitized signal into analog form that is scrambled with respect to the input signal for transmission through the communication channel. At the receiving end of the channel, an n-level digitizing of the transmitted signal is performed, followed by an inverse transformation of the levels of the digitized signal using the inverse of the pre-selected transformation code used on the digitized input signal. The inversely transformed signal is then converted into an analog signal which is representative of the input signal.

The communication channel can be an acoustic medium, a telephone line, or a CB radio link. The signal processing means can be realized using microprocessors with fixed or variable programming to change the pre-selected transformation code, or tape or card readers to which a tape or card is applied for the purpose of establishing the pre-selected transformation code.

18 Claims, 7 Drawing Figures

FIG. 1.
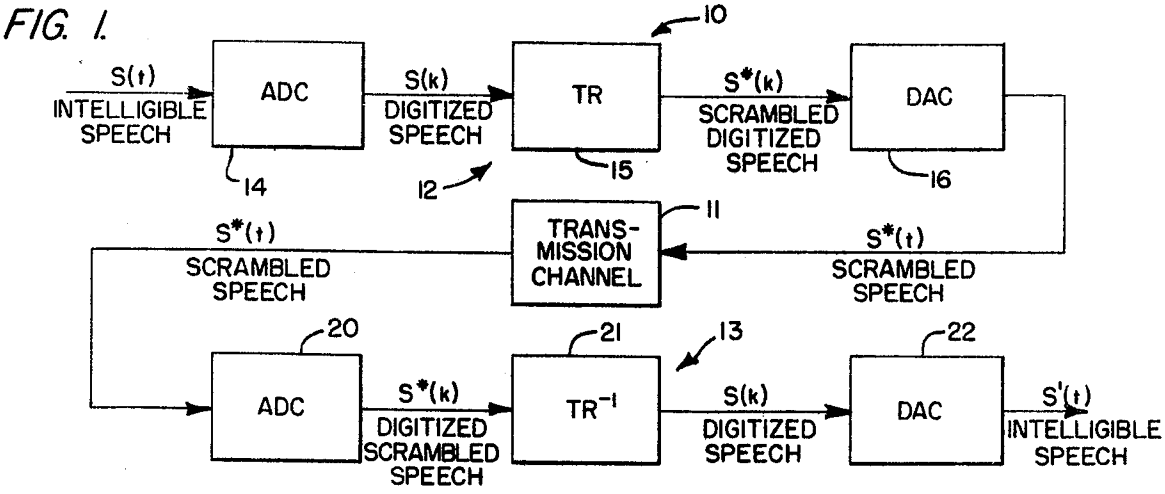
FIG. 2A.
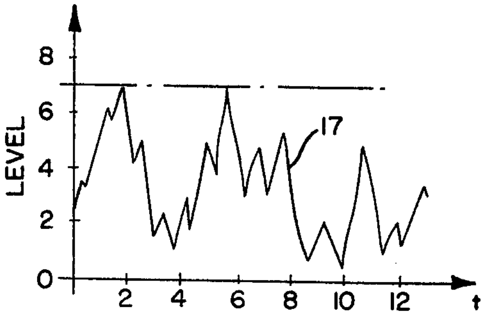
FIG. 2B.
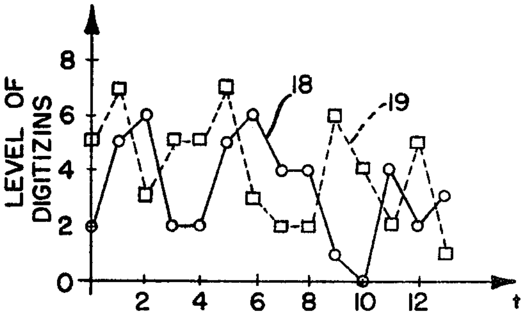
FIG. 3.
| TR | $TR^{-1}$ | CODE | | | | | | | |
|---|---|---|---|---|---|---|---|---|---|
| INPUT | OUTPUT | 0 | 1 | 2 | 3 | 4 | 5 | 6 | 7 |
| OUTPUT | INPUT | 4 | 6 | 5 | 1 | 2 | 7 | 3 | 0 |
FIG. 4A.
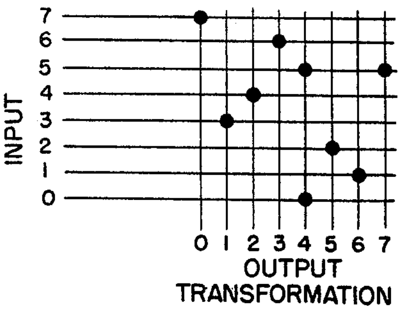
FIG. 4B.
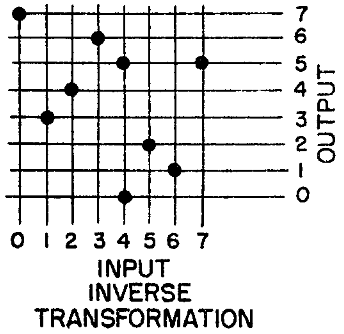
FIG. 5.
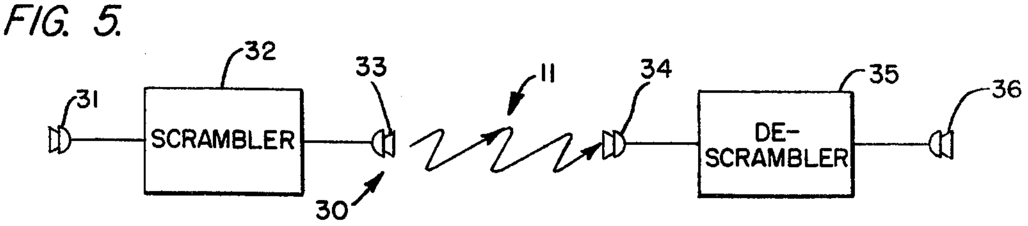

METHOD OF AND MEANS FOR SCRAMBLING AND DESCRAMBLING SPEECH AT AUDIO FREQUENCIES

BACKGROUND OF THE INVENTION

This invention relates to a method of and means for scrambling an input analog signal that is to be transmitted through a communication channel such that the transmitted signal is unintelligible, but can be descrambled after transmission to recover the original input signal.

Many techniques are available for scrambling analog signals, particularly audio signals such as speech. Such techiques usually involve a scrambling operation at frequencies much higher than audio frequencies; and, as a consequence, the equipment, usually involving high frequency modulation, demodulation and transmission, becomes complicated and expensive. Often, the bandwidth of the transmission must be considerably wider than the bandwidth of the original signal. A great deal of interest has been expressed in having scramblers that operate in an acoustic medium and over telephone lines where the frequencies used for communication cation are limited to the audio frequencies.

It is therefore an object of the present invention to provide a new and improved technique for scrambling and descrambling audio signals at audio frequencies thereby expanding due to communication channels utilizing only audio frequencies without requiring modulation or demodulation.

SUMMARY OF THE INVENTION

In accordance with the present invention, processing an input audio-frequency signal, for example, speech, which is to be transmitted through a communication channel, includes performing an *n*-level digitizing of the input signal, transforming the levels of the digitized signal to other levels using a pre-selected transformation code, and converting the transformed digitized signal into analog form that is scrambled with respect to the input signal for transmission through the communication channel. At the receiving end of the channel, an *n*-level digitizing of the received signal is performed, followed by an inverse transformation of the levels of the digitized signal using the inverse of the pre-selected transformation code used on the digitized input signal. The inversely transformed signal is then converted into an analog signal which is representative of the input signal.

The communication channel can be an acoustic medium, a telephone line, or a CB radio link. The signal processing means can be realized using microprocessors with fixed or variable programming to change the pre-selected transformation code, selectively operable switches for establishing and/or changing the pre-selected transformation code, or tape or card readers to which a tape or card is applied for the purpose of establishing the pre-selected conversion code.

BRIEF DESCRIPTION OF THE DRAWINGS

Embodiments of the present invention are disclosed in the accompanying drawings wherein:

FIG. 1 is a block diagram of apparatus according to the present invention;

FIG. 2A is typical time-variable audio frequency signal showing eight levels of amplitude;

FIG. 2B is a digitized version of the signal of FIG. 2A and showing transformation of the digitized signal using the eight-bit conversion code illustrated in FIG. 3;

FIG. 3 is a pre-selected eight-bit transformation code showing transformation and inverse transformation;

FIG. 4A is a matrix arrangement for achieving the transformation indicated in FIG. 3;

FIG. 4B is a matrix arrangement for achieving the inverse transformation indicated in FIG. 3; and FIG. 5 is a block diagram of one embodiment of the invention.

DETAILED DESCRIPTION OF THE DRAWINGS

Referring now to FIG. 1, reference numeral 10 designates apparatus according to the present invention for processing an input audio-frequency signal in the form of speech which is to pass, scrambled, through transmission channel 11. Apparatus 10 includes scrambler means 12 and descrambler means 13.

Scrambler means 10 includes an analog-to-digital converter 14, transformation circuit 15, and a digital-to-analog converter (A.D.C.) 16. Converter 14 performs on the input speech signal S(t), an *n*-level digitization for obtaining digitized signal S(k). The term "*n*-level digitization" means an analog-to-digital conversion in which the amplitude of the input signal is scaled to *n* levels. In the example shown in FIGS. 2A and 2B, an eight-level digitization process is carried out. That is to say, the amplitude of speech signal 17 is divided into eight levels (0–7) and one of eight levels is assigned to the speech signal each time the latter is sampled. (As is well known, the sampling frequency should be twice the highest frequency to be transmitted.)

After digitization, signal 17 would have the form shown at 18 in FIG. 2B, it being understood that curve 18 merely connects the discrete points that are circled indicating the amplitudes of the discrete outputs of converter 14 at the sampling times shown on the time scale of FIG. 2B. Obviously, some information in signal 17 has been lost, but the loss can be made arbitrarily small by suitably increasing the sampling frequency and the number of levels of digitization.

Transformation circuit 15 transforms the levels of the digitized signal S(*k*) into other levels using a pre-selected *n*-bit transformation code thereby producing a scrambled digitized speech signal S*(*k*). The term "pre-selected *n*-bit transformation code" means the relationship between input and output levels. In the example shown in FIG. 3, levels 0–7 are transformed to levels 4-6-5-4-1-2-7-3-0, respectively. That is to say, when the level at the input to circuit 15 is 0, the output of this circuit is 4. Curve 19 in FIG. 2B represents the output of circuit 15 for the input shown by curve 18. Again it should be understood that curve 19 connects the discrete points that are contained in the square marks which represent the amplitudes of the discrete outputs of circuit 15 at the sampling times shown.

D.A.C. 16 operates on the scrambled digitized speech signal S*(*k*) to convert the same to an analog signal S*(*t*) which forms a scrambled speech signal. The latter will have the form shown at 19 in FIG. 2B. From inspection, it can be seen that curve 19 is significantly different from curve 18 (which represents the intelligible speech), and the intelligence therein will be concealed.

Those skilled in the art will recognize that more than eight levels of digitization and/or a different choice of code transformation from that shown in FIG. 3 will provide greater concealment (i.e., scrambling) of the intelligence in the input signal. Thus, the levels and specific conversion and transformation code described above and shown in the drawing are meant to illustrate the principles of the invention and should not be construed as limiting the present invention to the examples shown.

The scrambled speech signal $S^*(t)$ is applied to transmission channel 11 which can be an acoustic medium (i.e., a medium that transmits sound), a conventional telephone line or an RF link such as a CB channel. In such case D.A.C. 16 includes a speaker whose output is transmitted through air, (for example, via proximity locationing) to a microphone that is part of a loudspeaker system or to the input side of a conventional telephone, or to the microphone of a conventional radio transmitter. Transmission channel 11 thus passes $S^*(t)$ either as an audio acoustic signal developed by a loudspeaker and passing through an acoustic medium, or as an electrical audio frequency signal passing through a conventional telephone line, or as an RF carrier modulated by an audio frequency signal passing between CB or other radio stations; and in such case, $S^*(t)$ is recovered at the output of this channel. Since signal $S^*(t)$ is in a scrambled mode, it will be unintelligible to any person within hearing distance of the loudspeaker of a loudspeaker system, or at the other end of the telephone line or at the speaker of a radio receiver not equipped with a descrambler.

To unscramble $S^*(t)$ after transmission through channel 11, descrambler means 13 is utilized. Descrambler 13 includes analog-to-digital converter 20, inverse transformation circuit 21, and digital-to-analog converter (D.A.C.) 22. Converter 20 performs on signal $S^*(t)$ the same digitication process carried out by converter 14 on the original input signal $S(t)$. That is to say, an $n$-level digitization is performed yielding a digitized scrambled speech signal $S^*(k)$. In other words, the input to circuit 21 is the discrete values represented by curve 19 in FIG. 2B. Circuit 21 inversely transforms the levels of signal $S^*(k)$ using the inverse of the pre-selected $n$-bit transformation employed by circuit 15. The output of circuit 15 is thus digitized speech signal $S(k)$, namely the discrete values represented by curve 18 in FIG. 2B.

Finally, the recovered digitized speech signal $S(k)$ is applied to D.A.C. 22 which converts signal $S(k)$ to a representation $S(t)$ of the original intelligible speech $S(t)$. As indicated above, the representation can be made arbitrarily close to the original signal by suitable selection of sampling frequency and number of levels of digitization.

FIGS. 4A and 4B represent, in matrix form, the transformation and inverse transformation processes carried out by circuits 15 and 21, respectively, for the example shown in FIG. 3. For an $n$-bit transformation code, there are $n!-1$ different possible codes most of which are usable in the sense of producing an output significantly different from the input. Consequently, in an 8-bit transformation code, $8!-1$ different possible codes are available, and most of these are useful for scrambling purposes.

There are many possible ways to carry out the transformation and inverse transformation process. For example, micro-electronic logic means, or a microprocessor could be employed. Another approach is to provide a switch or diode matrix. In the case of a matrix of switches, the state of the matrix could be selected thus establishing the pre-selected code. Alternatively, a tape and tape reader could be used for each of circuits 15 and 21, or a card and card reader could be used. In such case, the tape or card could contain one or more codes that would be selected by the user of the scrambler means 10. Obviously, the user of descrambler means 13 would have to know the code being used before descrambling can take place to recover the original signal.

As indicated in FIGS. 4A and 4B, a pin-diode matrix could provide the conversion coding for the circuits 15 and 21.

FIG. 5 shows a simple secure communication system 30 by which the speech of one person talking into microphone 31 could be understood by another person only if the latter had access to loudspeaker 36. The speech would be scrambled in scrambler means 32 using the techniques described above according to the selected code. The output of speaker 33 would contain practically all the intelligence in the speech, but it would be concealed and not available to a person listening to the output of speaker 33.

After transmission via air, telephone line or radio, the scrambled speech would be received by the second person's microphone 34. If the latter sets into descrambler means 35 the same code selected by the first person, means 35 will properly descramble the scrambled speech and essentially the same sound at microphone 31 will be reproduced by speaker 36. The reverse process could take place from the second to the first person. Thus, the present invention permits two-way secure voice transmission to take place.

Means 34, 35 and 36 may be incorporated, advantageously, into a device like a hearing-aid that can be donned and removed easily. When the person at each end of a conventional telephone line wears a device of this nature, and when each person interposes a unit comprising means 31, 32 and 33 between his mouth and the input end of a conventional telephone, the transmission over the telephone line will be unintelligible to anyone listening on the line without a device like means 34, 35 and 36 set with the proper transformation code.

Alternatively, if each person speaking via a CB link interposed means 31, 32 and 33 between his mouth and his CB microphone, the radio transmission would be intelligible only to a listener wearing a hearing-aid into which means 34, 35 and 36 are incorporated and set with the proper transformation code.

It is believed that the advantages and improved results furnished by the apparatus of the present invention are apparent from the foregoing description of the several embodiments of the invention. Various changes and modifications may be made without departing from the spirit and scope of the invention as sought to be defined in the claims that follow.

I claim:

1. A method for processing an input audio-frequency signal which is to be transmitted through a communication channel comprising (a) scrambling the input signal by:

(1) performing an $n$-level digitization of the input signal for obtaining a digitized signal;

(2) transforming levels of the digitized signal to other levels using a pre-selected $n$-bit transformation code for obtaining a scrambled digitized signal; and (3) converting the scrambled digitized signal into analog form to obtain a scrambled analog signal;

(b) transmitting the scrambled analog signal through the channel; and (c) decrambling the transmitted scrambled analog signal by:

(1) performing an $n$-level digitization of the transmitted scrambled analog signal for obtaining a digitized transmitted signal;

(2) inversely transforming the levels of the digitized transmitted signal using the inverse of the pre-selected $n$-bit transformation code used in step (a)(2) for obtaining an unscrambled digitized signal; and (3) converting the unscrambled digitized signal into analog form for obtaining a representation of the input audio-frequency signal.

2. A method according to claim 1 wherein the input signal is speech.

3. A method according to claim 2 wherein the transmission channel for the scrambled analog frequency signal is an acoustic medium.

4. A method according to claim 2 wherein the transmission channel for the scrambled analog frequency signal is a telephone line.

5. The method according to claim 2 wherein the transmission channel for the scrambled analog frequency signal is an RF link, such as a CB channel.

6. Transformation apparatus for processing an input audio-frequency signal which is to be transmitted through a communication channel comprising:

(a) scrambler means for scrambling the input signal including:

(1) means for performing an $n$-level digitization of the input signal to obtain a digitized signal;

(2) transformation means for transforming levels of the digitized signal to other levels using a preselected $n$-bit transformation code to obtain a scrambled digitized signal; and (3) means for converting the scrambled digitized signal into analog form to obtain a scrambled analog signal;

(b) transmitting means for transmitting the scrambled analog signal through the channel; and (c) descrambler means for descrambling the transmitted scrambled analog signal including:

(1) means for performing an $n$-level digitization of the transmitted scrambled analog signal to obtain a digitized transmitted signal;

(2) inverse transformation means for inversely transforming the levels of the digitized transmitted signal using the inverse of the pre-selected $n$-bit transformation code used by the transformation means to obtain an unscrambled digitized signal; and (3) means for converting the unscrambled digitized signal into analog form for obtaining a representation of the input audio-frequency signal.

7. Transformation apparatus according to claim 6 including micro-processors for performing the transformation and inverse transformation steps.

8. Transformation apparatus according to claim 6 including separate switch means for performing the transformation and inverse transformation steps, the state of the switch means being selectable and determining the pre-selected code.

9. Transformation apparatus according to claim 6 including a separate tape containing at least said pre-selected code, and a separate tape reader responsive to the tape for establishing the $n$-bit transformation code.

10. Transformation apparatus according to claim 6 including a separate card containing at least said pre-selected code, and a card reader responsive to the card for establishing the $n$-bit transformation code.

11. Apparatus according to claim 6 including a first microphone for receiving the input signal, the scrambler means being responsive to the output of the first microphone for scrambling the input signal, the transmitting means including a first speaker responsive to the output of the scrambler for transmitting the scrambled analog signal, a second microphone for receiving the scrambled analog signal, the descrambler means being responsive to the output of the second microphone for descrambling the scrambled analog signal, and a second speaker responsive to the output of the descrambler for reproducing the unscrambled analog signal.

12. Apparatus according to claim 11 wherein the descrambler is part of a hearing aid.

13. Apparatus according to claim 11 including a telephone system for interconnecting the first speaker with the second microphone.

14. Apparatus according to claim 11 including a CB radio link for interconnecting the first speaker with the second microphone.

15. Apparatus according to claim 11 including a loudspeaker to serve as the first speaker for sound communication with the second microphone.

16. Apparatus according to claim 11 wherein the scrambler and descrambler include microprocessors.

17. Apparatus according to claim 11 where each of the scrambler and descrambler include switch means for performing the transformation and inverse transformation steps, the state of the switch means determining the pre-selected code used for scrambling and descrambling.

18. Apparatus according to claim 11 including a separate tape containing at least said pre-selected code, and a separate tape reader responsive to the tape for establishing the $n$-bit conversion code.

* * * * *